Figure 1:
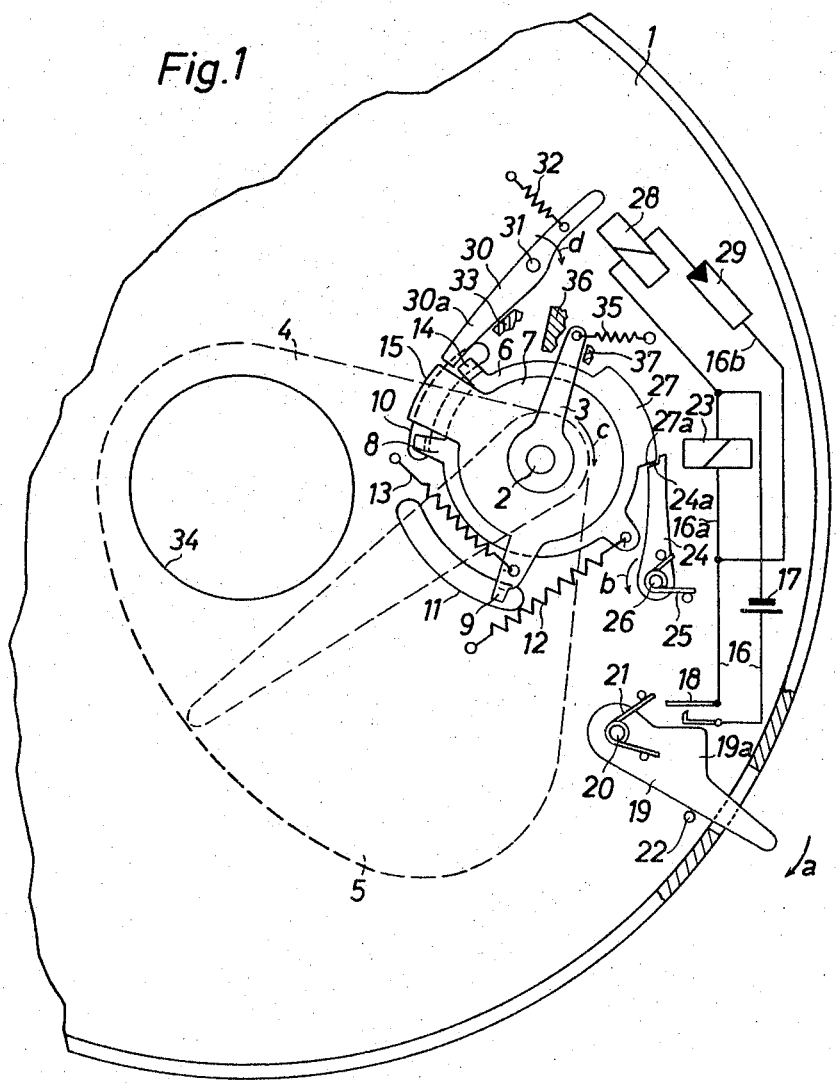

United States Patent Office 3,314,347
Patented Apr. 18, 1967

3,314,347
CAMERA SHUTTERS
Rudolf Kremp, Grunwald, Munich, and Gerd Kiper, Unterhaching, Munich, Germany, assignors to Agfa Aktiengesellschaft, Leverkusen, Germany
Filed Oct. 20, 1964, Ser. No. 405,096
6 Claims. (Cl. 95—10)

The present invention relates to cameras.

More particularly, the present invention relates to camera shutters of the type which include leading and trailing shutter blades, the leading blade moving from a cocked to a rest position in advance of the trailing blade in order to initiate an exposure, and the trailing blade then moving from its cocked to its rest position to terminate the exposure.

Shutters of this type have been combined with structure for automatically determining the moment of release of the trailing blade in accordance with the lighting conditions. However, with shutters of this conventional type the shortest possible exposure time is necessarily greater than the time required for the leading blade to move from its cocked to its rest position, and in addition the shortest possible exposure time is greater than the minimum time required for a relay which controls the trailing blade to respond and release the trailing blade in accordance with the intensity of light received by a photosensitive resistor. Therefore, with these conventional structures it is not possible to achieve extremely short exposure times.

It is accordingly a primary object of the present invention to provide for a shutter of this type a structure which will enable the exposure time to be shorter than has heretofore been possible.

Thus, it is an object of the present invention to provide a structure of the above type which does not have the extent to which the exposure time can be shortened limited by the time required for running down of the leading shutter blade.

Also, it is an object of the present invention to provide a structure of the above type which does not have the extent to which the exposure time can be shortened limited by the minimum time required for response of a relay.

With these objects in view the invention includes, in a camera, a shutter means provided with leading and trailing shutter blades, the leading blade moving from its cocked to its rest position in advance of the trailing blade to initiate an exposure, and the trailing blade then moving from its cocked to its rest position to terminate the exposure. A first relay means cooperates with the trailing blade to release the latter for movement from its cocked to its rest position, and this first relay means is located in an electrical circuit which also includes a photosensitive resistor which in accordance with the light received thereby controls the moment when the first relay means releases the trailing blade. In accordance with the present invention a second relay means is included in the circuit and cooperates with the leading blade to control the release of the latter for movement from its cocked to its rest position, and the circuit also includes a switch means for controlling the circuit. A manually operable means is provided for actuating the switch means to cause the second relay means to respond for releasing the leading blade so as to initiate an exposure in response to actuation of the manually operable means.

Figure 2:
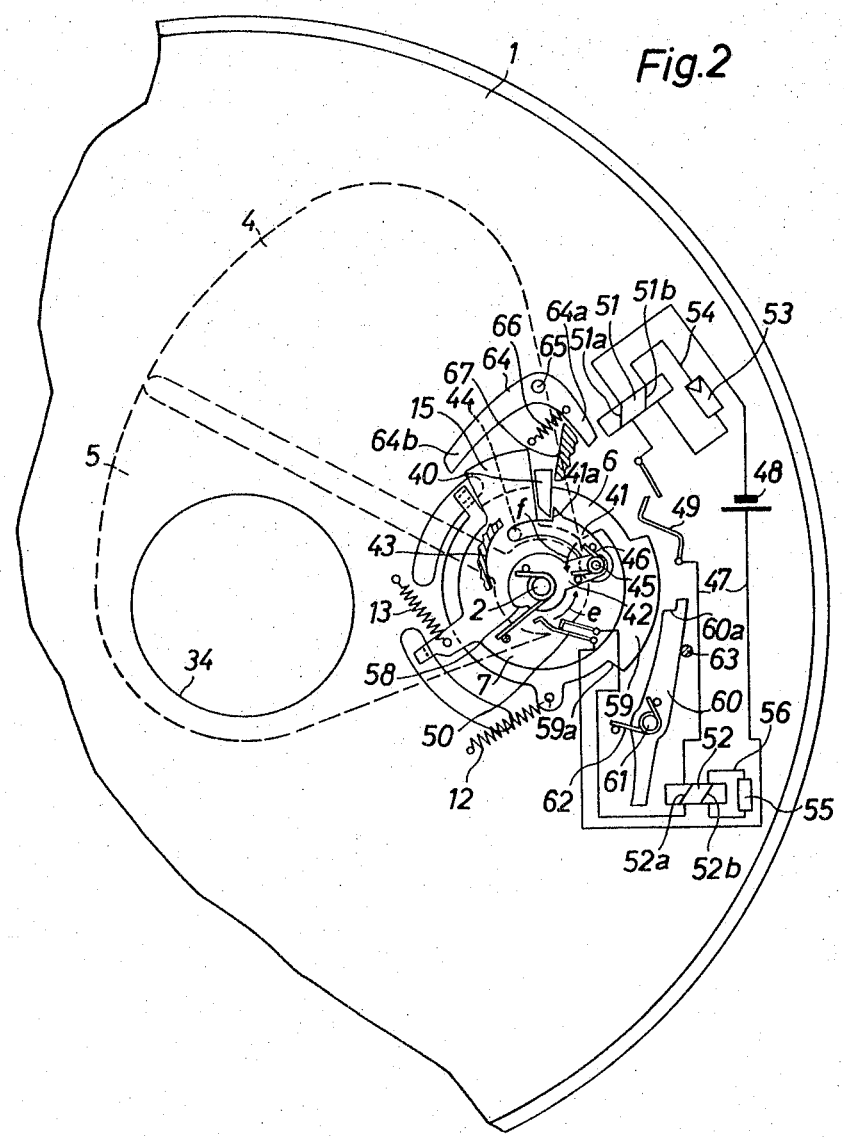

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly sectional schematic elevation of one possible embodiment of a structure according to the present invention; and FIG. 2 is a fragmentary partly sectional schematic illustration of another embodiment of a structure according to the present invention.

Referring now to FIG. 1, the between-the-lens shutter assembly illustrated therein includes a supporting plate 1 which supports a shaft 2 for rotary movement, and any suitable manually operable means is accessible to the operator for manually turning the shaft 2. The shaft 2 fixedly carries a cocking lever 3. Also, the shaft 2 supports for free rotary movement with respect to the shaft 2 a pair of shutter blades 4 and 5 situated at the side of the plate 1 which is not visible in FIG. 1. At the side of the plate 1 which is visible in FIG. 1, the shaft 2 supports for free rotary movement with respect to the shaft 2 a pair of blade-driving disks 6 and 7. The disk 6 has an angularly bent arm 8 extending into an opening of the plate 4 so that the latter turns with the disk 6, and this blade 4 is the leading blade of the shutter. The disk 7 has an angularly bent arm 9 extending into an opening of the blade 5 so that the latter turns with the disk 7, and the blade 5 is the trailing blade of the shutter. The arms 8 and 9 respectively extend through circular slots 10 and 11 passing through the plate 1 and extending respectively along circles which have a common center in the axis of the shaft 2, so that in this way the disks and blade are free to turn with respect to the plate 1 which is situated therebetween. If the disks and blades are located on the same side of the plate the disks can be formed integrally with the shutter blades. A spring 12 is operatively connected to the disk 6 for urging it to its rest position, and a spring 13 is operatively connected to the disk 7 for urging the latter to its rest position. The disk 6 has a lug 14 situated in the path of turning of the cocking lever 3, and the disk 7 has an extension 15 situated in the path of turning of the the lug 14 so that the latter forms a stop member determining the rest position of the trailing blade 5.

The exposure controlling structure, which in accordance with the invention also serves to release the leading blade 4, includes an electrical circuit 16 in which a current source 17 and a switch means 18 are located in series. The switch 18 is a normally open switch shown in its open position in FIG. 1. A manually operable means is accessible to the operator for closing the switch 18, and this manually operable means takes the form of a lever 19 extending through a slot in the outer wall of the shutter housing to the exterior thereof and supported for rotary movement by a pin 20 fixedly carried by the plate 1. The lever 19 has a projection 19a which closes the switch 18 when the operator turns the lever 19 in opposition to the spring 21 which urges the lever 19 in the direction of the arrow $a$ against the stop pin 22 which is fixedly carried by the plate 1.

The circuit 16 also includes a pair of branches 16a and 16b which are connected in parallel. A relay 23 is situated in the branch 16a and controls a release pawl 24 which forms an armature of the relay. A spring 25 acts on the pawl 24 to urge it in the direction of the arrow $b$ about a stationary pin 26 fixedly carried by the plate 1. The free end of the pawl 24 is formed with a notch 24a which receives, in the cocked position of the shutter shown in FIG. 1, the end 27a of a projection 27 of the disk 6, the spring 12 urging the end 27a of projection 27 into the notch 24a.

The branch 16b of the circuit 16 includes a relay 28 and a photo sensitive resistor 29 which are connected in series in this branch. The relay 28 cooperates with a pawl 30 which forms an armature of the relay, and this pawl 30 is pivotally supported by a pin 31 which is carried by the plate 1, a spring 32 acting on the pawl 30 to urge it into engagement with the stationary stop member 33. In this position of the pawl 30, its arm 30a is situated in the path of running down movement of the projection 15 of the disk 7, and thus the pawl 30 will prevent the disk 7 from being turned in the direction of the arrow c by the spring 13.

In order to make an exposure, the operator will manually turn the lever 19 in a direction opposite to the arow a so that its projection 19a will close the switch 18 and thus close the circuit 16. The current flowing through the circuit first causes the relay 23 to respond so that the pawl 24 turns in a direction opposite to the arrow b. Therefore, the disk 6 is now released and the spring 12 can turn the disk 6 together with the leading blade 4 until the projection 14 engages the stop 36 which determines the rest or run down position of the leading blade. In this way, the exposure opening 34 of the plate 1 is uncovered and light can pass through the opening 34 in order to expose the film.

Because of the photosensitive resistor in the branch 16b, the magnetic field of the relay 28 which is required to pull the pawl 30 in the direction of the arrow d can only be built up in a delayed manner. The delay in the build up of this field is a function of the resistance of the photosensitive resistor 29, and thus a function of the light intensity measured by the resistor 29. In accordance with this light intensity the relay 28 will respond in order to turn the pawl 30 in the direction of the arrow d, and now the arm 30a will release the projection 15 of the disk 7 so that the spring 13 can now turn the latter and the trailing blade 5 until the projection 15 engages the projection 14 so that the opening 34 is closed and the exposure is terminated. Thus, the time during which the opening 34 remains open is determined by the light intensity.

In order to cock the shutter the operator will turn the shaft 2 and the cocking lever 3 therewith, in opposition to the spring 35 which seeks to return the lever 3 to its rest position in engagement with the stop 37. The lever 3 at this time turns in a direction opposite to the arrow c and engages the projection 14 to turn the latter and the projection 15 therewith, so that both driving disks 6 and 7 and shutter blades 4 and 5 therewith are returned to the cocked position shown in FIG. 1, and when the operator releases the shaft 2 the spring 35 will return the lever 3 to its rest position. The connection of both of the relays 23 and 28 to the source 17 prevents the factor of the smallest possible relay-response time from influencing the exposure time. Thus, in comparison with conventional structures, an undesirably large exposure time necessarily produced by the time required for running down of the leading blade is avoided with the present invention.

According to the embodiment of the invention which is illustrated in FIG. 2, the shutter also includes a pair of blade-driving disks 6 and 7 operatively connected with leading and trailing shutter blades 4 and 5, respectively. While the shutter of FIG. 1 was capable of being cocked and then released at a later time when the operator turned the lever 19, the shutter of FIG. 2 is of the type which automatically runs down once it is placed in its cocked position by the operator. In the embodiment of FIG. 2, the disk 6 carries a projection 40 which cooperates with a tooth 41a of a cocking pawl 41. This pawl 41 is pivotally carried by a pin 45 which is carried by a cocking lever 42 which is also fixed to the shaft 2, and the shaft 2 can be turned by any suitable unillustrated manually operable structure. The projection 40 is engaged by the projection 15 of the disk 7 which is urged by the spring 13 in a direction advancing the projection 15 toward the projection 40, so that during cocking movement of the lever 42 in the direction of the arrow e both of the disks 6 and 7 will be turned by the pawl 41 whose tooth 41a engages the projection 40. In order to displace the pawl 41 from the projection 40 the structure includes a stationary cam having a camming surface 43 which is engaged, at the end of the cocking movement by a pin 44 which is fixedly carried by a free end of the pawl 41, and the surface 43 cooperates with the pin 44 to turn the pawl 41 about the pin 45 in the direction of the arrow f in opposition to the spring 46 which is coiled about the pin 45 and has its free ends in engagement with pins which are respectively carried by the lever 42 and the pawl 41.

The exposure controlling structure of FIG. 2 includes a primary circuit 47 in which a current source 48, an interrupter switch 49 and a control switch 50 are arranged in series. Moreover, the primary circuit 47 includes windings 51a and 52a of a pair of relays 51 and 52, respectively, these windings also being connected in series with the remaining components of the primary circuit. The second winding 51b of the relay 51 is located in a secondary circuit 54 in series with a photosensitive resistor 53. The second winding 52b of the relay 52 is located in a second secondary circuit 56 in series with a fixed resistor 55.

In order to actuate the switch 50, which is a normally closed switch, the cocking lever 42 has a switch-actuating projection 58 arranged to open the switch 50 during turning of the lever 42 through a slight distance beyond the point where the pawl tooth 41a rides off the tip of the projection 40. Furthermore, the disk 6 is provided with a projection 59 which, during the beginning of the cocking movement, engages and closes the normally open switch 49. The end 59a of the projection 59 in addition functions as a catch to be received in the notch 60a at the end of a release pawl 60. This release pawl 60 is pivotally carried by a pin 61, which is fixed to the plate 1, and the pawl 60 forms an armature of the relay 52. A spring 62 urges the pawl 60 into engagement with the stationary stop member 63. In this latter position the notch 60a is located beyond the path of movement of the end 59a of the projection 59. The pawl 60 is of course turned by actuation of the relay 52. The relay 51 cooperates with a pawl 64 which forms an armature of the relay 51, the pawl 64 being supported for turning movement by a stationary pin 65 which is carried by the plate 1. A spring 66 acts on the pawl 64 to turn its arm 64a into engagement with a stationary stop member 67. In this position of the pawl 64, its second arm 64b is situated beyond the path of movement of the projection 15 during running down of the trailing blade.

In order to make an exposure with the embodiment shown in FIG. 2, the cocking lever 42 is turned when the operator manually turns the shaft 2 in the direction of the arrow e. The cocking pawl 41 of course turns with the lever 42. Since the tooth 41a of the pawl 41 engages the projection 40, the disk 6 and thus the projection 15 of the disk 7 are turned simultaneously, so that the blades 4 and 5 turn as a unit from their rest position illustrated in FIG. 2 toward their cocked position. After the blades have turned through a distance sufficient to cock the shutter, the pin 44 of the pawl 41 engages the camming surface 43 which acts on the pin 44 to turn the pawl 41 with respect to the lever 42 in the direction of the arrow f. In this way the tooth 41a is displaced beyond the projection 40, and the leading blade 4 is therefore released.

At the beginning of the cocking movement the projection 59 engaged and closed the normally open interruptor switch 49. As a result the primary circuit 47 was closed and current flowed therethrough. Both of the relays 51 and 52 therefore become energized upon closing of the switch 49. Thus, the relay 51 seeks to turn the pawl 64 into its position blocking the return of the projection 15, while the relay 52 seeks to turn the release pawl 60 also to a position in which the notch 60a will receive the end 59a of the projection 59. As soon as the disks 6 and 7 have turned through a distance sufficient to cock the shutter, the pawl 64 can move at its end 64b in front of the projection 15 and the pawl 60 can turn so as to receive the end 59a of projection 59 in the notch 60a, and thus both of these pawls will prevent running down of the shutter. During the relatively short extent of movement of the cocking lever 42 beyond the point where the shutter is cocked, the switch 50 is opened by the projection 58 of the lever 42, and thus the flow of current in the primary circuit 47 is interrupted. As a result of the inductance of the secondary circuits 54 and 56, in particular of the relay coils 51b and 52b therein, the deenergizing of the relays and thus the release of the pawl 60 and 64 is retarded. The time of the delay in the release of the pawls 60 and 64 thus is determined in the case of the pawl 64 by the photosensitive resistor 53 and in the case of the pawl 60 by the fixed resistor 55. The resistance of the fixed resistor 55 is so chosen that the relay 52 becomes deenergized after a hardly perceptible constant delay time. The pawl 60 is thus released after this extremely short time, and the spring 62 returns the pawl 60 to its rest position shown in FIG. 2. As a result the driving disk 6 is released to the spring 12 which turns the driving disk until its projection 40 engages the stationary stop member 67, and in this way the leading blade 4 turns from its cocked to its rest position so as to initiate the exposure. The turning of the leading blade 4 from its cocked to its rest position in the direction of the arrow e uncovers the opening 34 through which light reaches the film to expose the film.

Because the resistance of the photosensitive resistor 53 is determined by the intensity of the light impinging on the resistor 53, the time required for the relay 51 to become deenergized is greater than that required for the relay 52, and the time required for deenergizing of the relay 51 is determined by the light intensity. When the relay 51 becomes deenergized it releases the pawl 64 to the spring 66 which returns the pawl 64 to its rest position shown in the drawing, and thus the arm 64b moves away from the projection 15 of the disk 7 so that the spring 13 can now turn the disk 7 and the trailing blade 5 to the rest position shown in FIG. 2 where the opening 34 is again closed, and thus the exposure is terminated.

It will be seen, therefore, that with the embodiment of FIG. 2 also the exposure time determined by the light-controlled relay 51, in particular by the moment when the latter releases the trailing blade 5, is not influenced either by the running down time of the leading blade or by the minimum relay-response time required for the relay 51 to become deenergized.

The invention is not limited to the above details. The invention is also applicable to other shutters having a pair of leading and trailing blades for opening and closing the shutter, particularly shutters of the type referred to in the introduction. Also, other electrical structures, differing from those described above, can be used in order to influence the time of energizing and deenergizing of the relays in order to achieve the desired results.

It will be understood that each of the elements described above, or two or more together, may also find a useful application in other types of cameras differing from the types described above.

While the invention has been illustrated and described as embodied in shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a camera, in combination, shutter means including a leading blade and a trailing blade, said leading blade moving from a cocked to a rest position in advance of said trailing blade to open the shutter and expose film while said trailing blade then moves from its cocked to its rest position to close the shutter and terminate the exposure; delaying relay means including a photosensitive resistor and cooperating with said trailing blade for delaying release of the latter for movement from its cocked to its rest position in accordance with the intensity of light received by said photosensitive resistor; second immediately actuating relay means cooperating with said leading blade for immediately releasing the latter for immediate movement from its cocked to its rest position in order to initiate an exposure; switch means directly and simultaneously operating both of said relay means to actuate said immediately actuating relay means and to simultaneously start the delay of said delaying relay means; and manually operable means including cocking means for cocking said shutter means and cooperating after cocking of said shutter means with said switch means for actuating the latter as soon as said cocking means cocks said shutter means to operate said relay means for release of said cocked shutter means so as to make an exposure.

2. In a camera as recited in claim 1, said switch means being an interruptor switch and said manually operable means including a manually turnable lever having a projection for actuating said interruptor switch when said lever is turned by the operator.

3. In a camera, in combination, shutter means including a leading element and a trailing element, said leading element moving from a cocked to a rest position in advance of said trailing element to open the shutter and expose film while said trailing element then moves from its cocked to its rest position to close the shutter and terminate the exposure; delaying relay means including a photosensitive resistor and cooperating with said trailing element for delaying release of the latter for movement from its cocked to its rest position in accordance with the intensity of light received by said photosensitive resistor; second immediately actuating relay means cooperating with said leading element for immediately releasing the latter for immediate movement from its cocked to its rest position in order to initiate an exposure; switch means directly and simultaneously operating both of said relay means to actuate said immediately actuating relay means and to simultaneously start the delay of said delaying relay means; manually operable means cooperating with said switch means for actuating the latter to operate said relay means for making an exposure in response to actuation of said manually operable means; an electrical circuit connecting said relay means and said switch means, said delaying and said second immediately actuating relay means respectively including armatures in the form of pawls which respectively cooperate with said elements for releasing the latter for running down movement from their cocked to their rest positions, said circuit having a pair of parallel branches in which said delaying and said second immediately actuating relay means are respectively connected and said photosensitive resistor being situated in the circuit branch in which said delaying relay means is located.

4. In a camera, in combination, shutter means including a leading blade and a trailing blade, said leading blade moving from a cocked to a rest position in advance of said trailing blade to open the shutter and expose film while said trailing blade then moves from its cocked to its rest position to close the shutter and terminate the exposure; first relay means cooperating with said trailing blade for releasing the latter for movement from its cocked to its rest position; an electrical circuit including said first relay means and also including a photosensitive resistor cooperating with said first relay means for actuating the latter to release said trailing blade in accordance with the intensity of light received by said photosensitive resistor; second relay means connected into said circuit and cooperating with said leading blade for releasing the latter for movement from its cocked to its rest position in order to initiate an exposure; switch means connected into said circuit, said circuit having a primary portion in which the current source, said switch means, an interruptor switch, and a pair of windings of said first and second relay means are all located in series, said first and second relay means respectively including armatures in the form of pawls which release said leading and trailing blades for running down movement, said second relay means having a second winding connected into a secondary circuit portion of said circuit in which a fixed resistor is connected in series with said second winding of said second relay means, and said first relay means also having a second winding located in a second secondary circuit portion of said circuit, and said photosensitive resistor being connected into said second secondary circuit portion in series with said second winding of said first relay means, said leading blade of said shutter means being operatively connected with a projection holding said interruptor switch closed in the cocked position of said leading blade as well as during part of the subsequent running down of said leading blade, and cocking means for cocking said shutter means, said cocking means having a projection which engages and opens said switch means after said shutter means has been cocked; and manually operable means cooperating with said switch means for actuating the latter to operate said second relay means for initiating an exposure in response to actuation of said manually operable means.

5. In a camera, in combination, shutter means including leading and trailing elements, said leading element moving from a cocked to a rest position in advance of said trailing element to open the shutter and expose film while said trailing element then moves from its cocked to its rest position to close the shutter and terminate the exposure; first delaying relay means cooperating with said trailing element for releasing the latter from its cocked to its rest position and including a photosensitive resistor for delaying actuation of said delaying relay means so as to delay release of said trailing element in accordance with the intensity of light received by said photosensitive resistor; second immediately actuating relay means cooperating with said leading element for immediately releasing the latter for immediate movement from its cocked to its rest position in order to initiate an exposure; single circuit means including said first delaying relay means and said second immediately actuating relay means; switch means connected into said circuit for opening and closing the same for directly and simultaneously operating said first and second relay means so as to start the delay of release of said trailing element simultaneously with the immediate release of said leading element; and manually operable means cooperating with said switch means for actuating the latter to operate said relay means for making an exposure in response to actuation of said manually operable means.

6. In a camera, in combination, shutter means including leading and trailing elements, said leading element moving from a cocked to a rest position in advance of said trailing element to open the shutter and expose film while said trailing element then moves from its cocked to its rest position to close the shutter and terminate the exposure; first delaying relay means cooperating with said trailing element for releasing the latter from its cocked to its rest position and including a photosensitive resistor for delaying actuation of said delay relay means so as to delay release of said trailing element in accordance with the intensity of light received by said photosensitive resistor; second immediately actuating relay means cooperating with said leading element for immediately releasing the latter for immediate movement from its cocked to its rest position in order to initiate an exposure; electric circuit means including a pair of sub-circuits in which said first delaying and said second immediately actuating relay means are respectively connected and said photosensitive resistor being situated in the subcircuit in which said first delaying relay means is located; switch means connected into said circuit means for opening and closing the same for directly and simultaneously operating said first and second relay means so as to start the delay of release of said trailing element simultaneously with the immediate release of said leading element; and manually operable means cooperating with said switch means for actuating the latter to operate said relay means for making an exposure in response to actuating of said manually operable means.

References Cited by the Examiner

UNITED STATES PATENTS

| | | | |
|---|---|---|---|
| 2,179,717 | 11/1939 | Fedotoff | 95—60 |
| 2,978,970 | 4/1961 | Fahlenberg | 95—10 X |
| 3,165,989 | 1/1965 | Kiper | 95—10 |
| 3,205,795 | 9/1965 | Grey | 95—10 |
| 3,208,365 | 9/1965 | Cooper, et al. | 95—60 |

NORTON ANSHER, *Primary Examiner.*

J. F. PETERS, JR., *Assistant Examiner.*